(12) United States Patent
Landry et al.

(10) Patent No.: US 6,873,521 B2
(45) Date of Patent: Mar. 29, 2005

(54) MULTIPLE ENVIRONMENT FOLDABLE COMPUTER

(75) Inventors: Christian C. Landry, The Woodlands, TX (US); Michael J. Scully, San Francisco, CA (US); John E. Youens, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 39 days.

(21) Appl. No.: 09/912,696

(22) Filed: Jul. 24, 2001

(65) Prior Publication Data

US 2003/0021083 A1 Jan. 30, 2003

(51) Int. Cl.$^7$ .............................. H05K 5/02; G06F 1/16
(52) U.S. Cl. ................... 361/681; 361/683; 312/223.2; 348/794
(58) Field of Search ................................ 361/679–686; 312/223.2; D18/4.3, 4.5, 12.3; 348/794; 248/917–924; 345/905

(56) References Cited

U.S. PATENT DOCUMENTS

| | | | |
|---|---|---|---|
| 5,229,757 A | * 7/1993 | Takamiya et al. ....... 235/145 R |
| 5,241,303 A | * 8/1993 | Register et al. ......... 178/18.03 |
| 5,247,285 A | * 9/1993 | Yokota et al. ............... 248/919 |
| 5,260,884 A | * 11/1993 | Stern .......................... 361/680 |
| 5,260,885 A | * 11/1993 | Ma .............................. 136/245 |
| 5,268,817 A | * 12/1993 | Miyagawa et al. ......... 361/681 |
| 5,278,779 A | * 1/1994 | Conway et al. ............... 341/20 |
| 5,341,154 A | 8/1994 | Bird ............................ 345/167 |
| 5,383,138 A | * 1/1995 | Motoyama et al. ......... 361/683 |
| 5,416,730 A | * 5/1995 | Lookofsky ................... 361/680 |
| 5,440,502 A | 8/1995 | Register ................... 364/708.1 |
| 5,494,447 A | 2/1996 | Zaidan ........................ 439/31 |
| 5,548,478 A | 8/1996 | Kumar et al. ................ 361/681 |
| 5,646,820 A | * 7/1997 | Honda et al. ................ 361/683 |
| 5,666,694 A | * 9/1997 | Slow et al. .................... 16/308 |
| 5,719,799 A | * 2/1998 | Isashi .......................... 345/169 |

(Continued)

FOREIGN PATENT DOCUMENTS

| | | | | |
|---|---|---|---|---|
| CA | 2018680 A | 12/1991 | ............ G06F/1/16 |
| EP | 0834792 A2 | 8/1994 | ............ G06F/1/16 |
| JP | 04281509 A | * 10/1992 | ............ G06F/1/16 |
| JP | 05257568 A | * 10/1993 | ............ G06F/1/16 |
| JP | 08054962 A | * 2/1996 | ............ G06F/1/16 |
| JP | 411175188 A | 7/1999 | ............ G06F/1/16 |
| JP | 02001125668 A | 5/2001 | ............ G06F/1/16 |
| WO | WO 98/45769 | 10/1998 | |

OTHER PUBLICATIONS

Que's Computer User's Dictionary, Second Edition, by Bryan Pfaffenberger, Ph.D. School of Engineering and Applied Science University of Virginia, Que® Corporation, Carmel, Indiana, 1991 (copy of p. 229).*
AcAdemic Press Dictionary of Science and Technology, Edited by Christopher Morris, Academic Press, Inc., 1992, (copy of p. 864).*
Attached illustrations—2 pages; received from an outside party in correspondence dated May 31, 2001.

Primary Examiner—Anatoly Vortman

(57) ABSTRACT

A multi-sectional computing device configurable for a plurality of computing worlds, including portable and desktop computing worlds. The technique includes a space saving and configuration technique utilizing multiple joints disposed between multiple sections to facilitate rotational orientation of the sections to adjust for space limitations and other characteristics of a desired environment or computing world. The multiple sections include a display assembly and a housing assembly for computing components.

59 Claims, 6 Drawing Sheets

U.S. PATENT DOCUMENTS

| | | | |
|---|---|---|---|
| 5,726,684 A | 3/1998 | Blankenship et al. | 345/167 |
| 5,740,012 A | 4/1998 | Choi | 361/686 |
| 5,871,094 A * | 2/1999 | Leibowitz | 108/43 |
| 6,006,243 A * | 12/1999 | Karidis | 361/680 |
| 6,015,120 A * | 1/2000 | Sweere et al. | 248/123.11 |
| 6,076,786 A | 6/2000 | Meyer | 248/161 |
| 6,185,096 B1 | 2/2001 | Helot et al. | 361/686 |
| 6,205,021 B1 | 3/2001 | Klein et al. | 361/683 |
| 6,256,192 B1 | 7/2001 | Shannon | 361/683 |
| 6,295,038 B1 | 9/2001 | Rebeske | 345/1 |
| 6,296,408 B1 | 10/2001 | Larkin et al. | 400/682 |
| 6,353,529 B1 * | 3/2002 | Cies | 248/917 |
| 6,392,871 B1 * | 5/2002 | Yanase | 345/905 |
| 6,392,877 B1 | 5/2002 | Iredale | 361/683 |
| 6,430,038 B1 | 8/2002 | Helot et al. | 361/681 |
| 6,480,376 B1 * | 11/2002 | Nguyen et al. | 361/686 |

* cited by examiner

US 6,873,521 B2

MULTIPLE ENVIRONMENT FOLDABLE COMPUTER

FIELD OF THE INVENTION

The present technique relates generally to the field of computer systems and, more specifically, to a unique computing device adaptable to multiple computing environments, e.g. as a portable computer or a desktop computer, and space constraints. The present technique is a system and method for flexibly integrating computing components to facilitate multiple operating arrangements in various environments, each of which may have particular operational constraints for use of a computer system.

BACKGROUND OF THE INVENTION

Computer systems generally include a computer unit and peripherals. For example, a typical computer unit may include a computer housing having a motherboard, a processor, a hard drive, random access memory (RAM), a disk drive (e.g., a floppy drive, a CD-ROM drive, a DVD-ROM drive, a tape drive, etc.), communication ports, a cooling system (e.g., a fan), a power supply, a modem, a network device, an audio assembly (e.g., a sound card, a speaker, etc.), and other computing devices. The computer system also may include peripherals, such as a monitor, a printer, a scanner, a keyboard, a mouse, speakers, a disk drive or other storage devices, a modem or other communication devices, and various other standalone components. Accordingly, a typical computer system includes a variety of separate components communicating through various ports, such as serial, parallel, PS/2, video, USB, IRDA (infrared), and various other communication protocols. Moreover, each of these components consumes a considerable amount of workspace.

Conventional computer systems are generally grouped and designed for distinct operating environments, such as home use, mobile use, or commercial use. For example, a typical consumer may have a home computer, a work computer, and a laptop computer. The home and work computers are typically desktop computers, which consume a considerable amount of space and have a number of peripheral components consuming additional space. Laptop computers are relatively more compact than desktop computers, yet laptop computers generally have limited resources and are often inconvenient to use in the typical non-mobile working environment. Moreover, each computer system costs a substantial amount of money, while the consumer is not gaining any additional resources other than cumulative resources designed for particular working environments.

Regardless of the type of computer system (i.e., desktop or portable), a significant amount of workspace is consumed due to the conventional orientation of computer components. For example, desktop units have a large footprint in both horizontal and vertical orientations. Monitors also have a large footprint, which generally increases with the viewable area. Laptop computers consume less space than desktop computers, but are intended for mobile use. For many users, the display screen, the keyboard, and other features of laptop computers are difficult or inconvenient to use. Accordingly, laptop computers are often connected to standard monitors, keyboards, and other desktop devices during non-mobile operation. Moreover, the laptop itself has a considerably large footprint, and also requires extra space for the display to be oriented at a desired viewing angle.

Accordingly, a technique is needed for reducing space requirements for computer systems and integrating working environments, or computing worlds, of computer systems. More particularly, a unique class of computer systems is needed to merge these multiple worlds, or computing environments, to facilitate efficient utilization of computing components and space. A need also exists for a computer system having a flexible structure capable of multiple orientations adaptable to a particular working environment.

SUMMARY OF THE INVENTION

The present technique includes a multi-sectional computing device configurable for a plurality of computing worlds, including portable and desktop computing worlds. The technique includes a space saving and configuration technique utilizing multiple joints disposed between multiple sections to facilitate rotational orientation of the sections to adjust for space limitations and other characteristics of a desired environment or computing world. The multiple sections include a display assembly and a housing assembly for computing components.

An aspect of the present technique comprises a computer system having a component housing and a display rotatably coupled to the component housing. The component housing includes a first section and a second section rotatably coupled to the first section.

Another aspect of the present technique comprises a method of forming a computing device having versatile configurations. The method includes rotatably coupling a plurality of panels configured for computing components. The method also includes rotatably coupling a display panel support structure to one of the plurality of panels. Also, the method includes supporting a plurality of geometrical orientations of the plurality of panels and the display panel.

BRIEF DESCRIPTION OF THE DRAWINGS

The invention will hereafter be described with reference to the accompanying drawings, wherein like reference numerals denote like elements, and.

DETAILED DESCRIPTION OF SPECIFIC EMBODIMENTS

Figure 1:
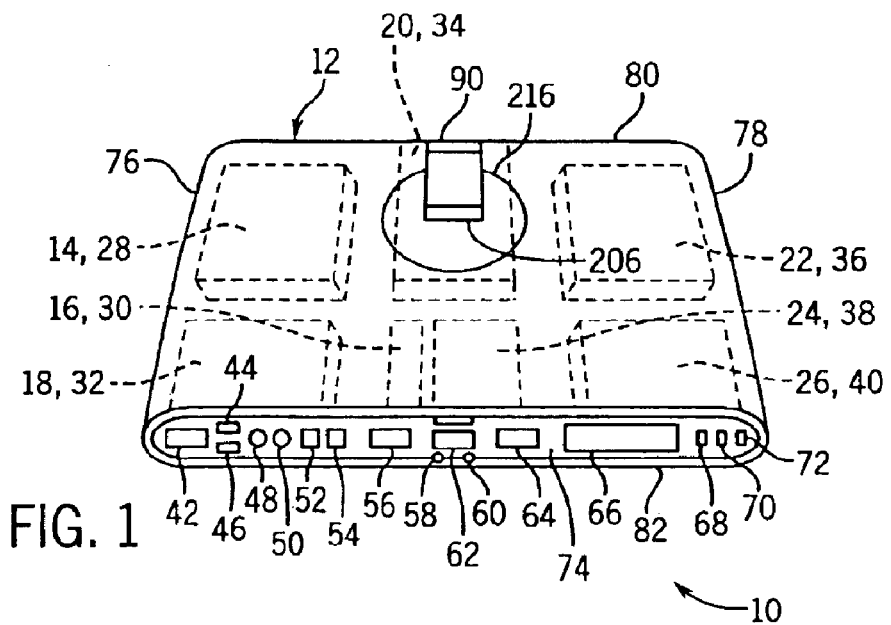
FIG. 1 is a front perspective view of an exemplar computing device of the present technique in a closed configuration.

FIG. 1 is a perspective view of an exemplary computing device 10 of the present technique. As illustrated, the computing device 10 has a body 12 housing a plurality of bays for devices. For example, the body 12 may have bays 14, 16, 18, 20, 22, 24 and 26 for devices 28, 30, 32, 34, 36, 38 and 40, respectively. These bays may be modular bays adapted for removable insertion of the devices, or these bays may be adapted for fixed insertion of the devices into the body 12. Also, the bays 14, 16, 18, 20, 22, 24 and 26 may be adapted for hot-plugging or plug-and-play insertion and configuration of the devices in the body 12 of the computing device 10. The devices 28, 30, 32, 34, 36, 38 and 40 may comprise a variety of computing components, such as a battery, a power supply, a disc drive, a hard drive, ram memory, a processor, a CD Rom drive, a CD-RW drive, a DVD Rom drive, a DVD Ram drive, a DVD-R drive, a DVD-RW drive, a tape drive, a communication device (e.g., a modem, a network card, wireless technology, blue tooth technology, etc.), and various other circuits and electronic components for the computing device 10. The computing device 10 also has a plurality of ports, such as ports 42, 44, 46, 48, 50, 52, 54, 56, 58, 60, 62 and 64. These ports may comprise a variety of communication standards or custom communication technologies, such as a serial port, a parallel port, a USB port, a PS/2 port, a video port, an optical/digital port, a wireless port (e.g., a radio frequency port, a blue tooth port, an optical port, etc.). The computing device 10 also may have a display 66, which may be an LCD display, for displaying status or other information for the computing device 10. A plurality of indicator lights, such as lights 68, 70, and 72, also may be disposed on the computing device for indicating a status of the computing device 10.

In this exemplary embodiment, the ports 42–64, the display 66, and the indicator lights 68–72 are disposed on a front face 74 of the computing device. However, the ports 42–64, the display 66, and the indicator lights 68–72 maybe disposed on a side 76, a side 78, a rear 80 or another section of the computing device 10. It should also be pointed out that the bays 14, 16, 18, 20, 22, 24 and 26 maybe accessible on the side 76, the side 78, the rear 80, or a bottom section 82, as desired for a particular application of the computing device 10. In this embodiment, the devices 28, 30, 32, 34, 36, 38, and 40 may comprise standard computing components (e.g., a desktop component, a laptop component, etc.), or it may comprise a unique class of computing components or customized compact components.

Figure 2:
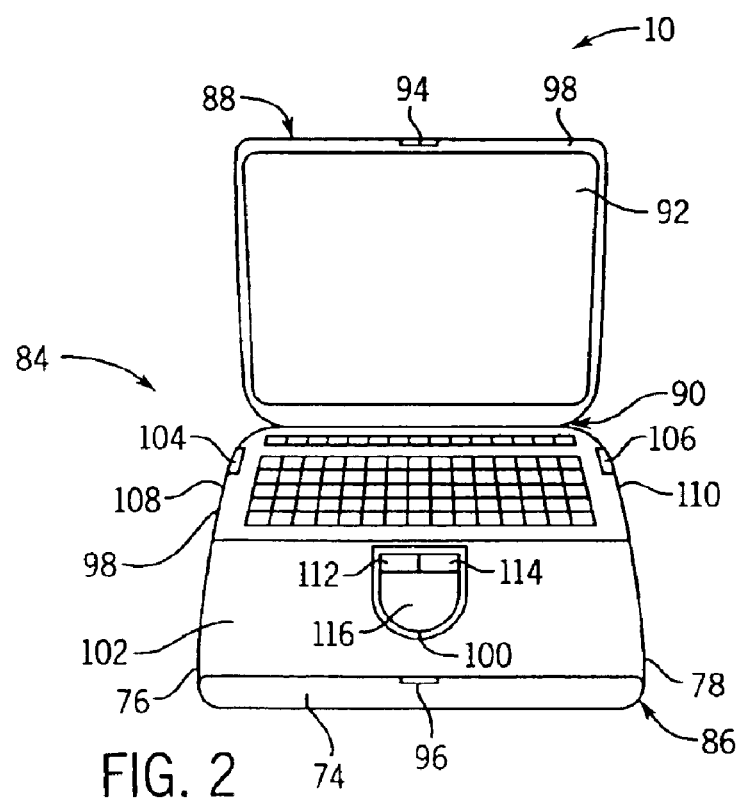
FIG. 2 is a front perspective view of the computing device in an open configuration.

In accordance with the present technique, the computing device 10 is configured to facilitate multiple mounting positions and viewing angles adaptable to a desired working environment. For example, the computing device 10 maybe quickly adapted to a home use environment, a travel environment, a business environment, a specific space limitation, and a plurality of other space and working limitations and environments. As illustrated in FIG. 2, an operational configuration 84 of the computing device 10 is provided which may be particularly well suited for a horizontal mount in a home or office environment.

In the illustrated embodiment, the computing device 10 has a base 86 and a display 88, which is rotatably coupled to the base 86 at a hinge structure 90 disposed between the display 88 and the base 86. The display 88 also has a display screen 92, which may be a flat screen or another compact display assembly having a relatively low profile. For example, the display screen 92 may be a liquid crystal display ("LCD") screen, which may be any dimension (e.g., 4", 8", 12", 16", 20", 24", 28", etc.) suitable for a particular application. The display 88 also has a latch release 94 for removable coupling with a latch 96 disposed on the base 86. In this illustration, the latch release 94 is disposed on an edge 98 of the display 88, while the latch 96 is disposed on the front face 74 of the base 86. However, the latch release 94 and corresponding latch 96 may be disposed on other portions of the computing device 10, such as the side 76, the side 78, or other desired sections of the computing device 10.

The base 86, in addition to having one or more of the bays 14, 16, 18, 20, 22, 24, and 26, also has a keyboard 98 and a pointing device 100 disposed on a top section 102 of the base 86. The keyboard 98 also may have releases 104 and 106 disposed on opposite sides 108 and 110 of the keyboard 98 for removing the keyboard from the base 86. For example, the releases 104 and 106 may be slidable release mechanisms, rotatable release mechanisms, push button release mechanisms, or other suitable release mechanisms. Alternatively, the keyboard 98 may have an automatic release mechanism or a software assisted release mechanism, which may be triggered by a click of a button or other events in the software or hardware operation of the computing device 10. The pointing device 100, as illustrated in FIG. 2, includes buttons 112 and 114 and a touch pad 116. However, the pointing device 100 may include any suitable pointing device and any number of buttons or other input technologies. It should also be noted that the pointing device 100 may be fixed to the section 102 of the computing device, or it may be removably attached in a receptacle of the section 102. For example, the pointing device 100 may have a release mechanism disposed under the keyboard 98 or in another suitable location or it may have an automatic or software-assisted release mechanism.

In the illustrated embodiment of FIG. 2, the various bays 14, 16, 18, 20, 22, 24, and 26 and the corresponding devices 28, 30, 32, 34, 36, 38, and 40 may be disposed entirely in the base 86 or partially in the base 86 and the display 88. For example, a low profile memory device, a low profile processing device, a low profile card or disc device, or any other suitable device may be disposed behind the display screen 92 in the display 88. Moreover, the computing device 10 may have a button, such as a hot key 118 on the keyboard 98, for releasing either the keyboard 98 or the pointing device 100 or both. Accordingly, the keyboard 98 and the pointing device 100 may be quickly removed from the base 86 and positioned in a desired orientation.

Figure 3:
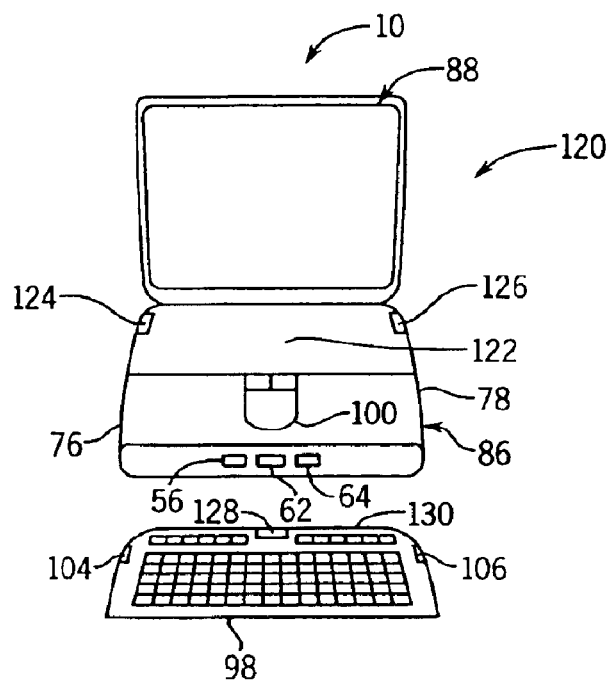
FIG. 3 is a front perspective view of the computing device having a keyboard removed from a receptacle on the computing device.

FIG. 3 is a perspective view of the computing device 10 in an operational configuration 120. As illustrated, the display 88 is in an upright orientation with respect to the base 86, as also illustrated in FIG. 2. The base 86 is orientated in a horizontal configuration having the keyboard 98 removed from a receptacle 122, or recessed surface, which is disposed between the display 88 and the pointing device 100. The receptacle 122 also has latches 124 and 126 on the sides 76 and 78 of the base 86. Accordingly, the latches 124 and 126 interact with the releases 104 and 106, respectively, to removably couple the keyboard 98 to the base 86 in the receptacle 122. The keyboard 98 also has a communication port, such as a port 128 disposed on a front side 130 of the keyboard, to communicate wirelessly with port 62 of the computing device 10. However, the port 128 may be disposed on any suitable side or portion of the keyboard 98, depending on the particular wireless technology. Moreover, the keyboard 98 may have a plurality of wireless communication ports and other port types to facilitate communication with a plurality of other computing devices and systems.

Figure 4:
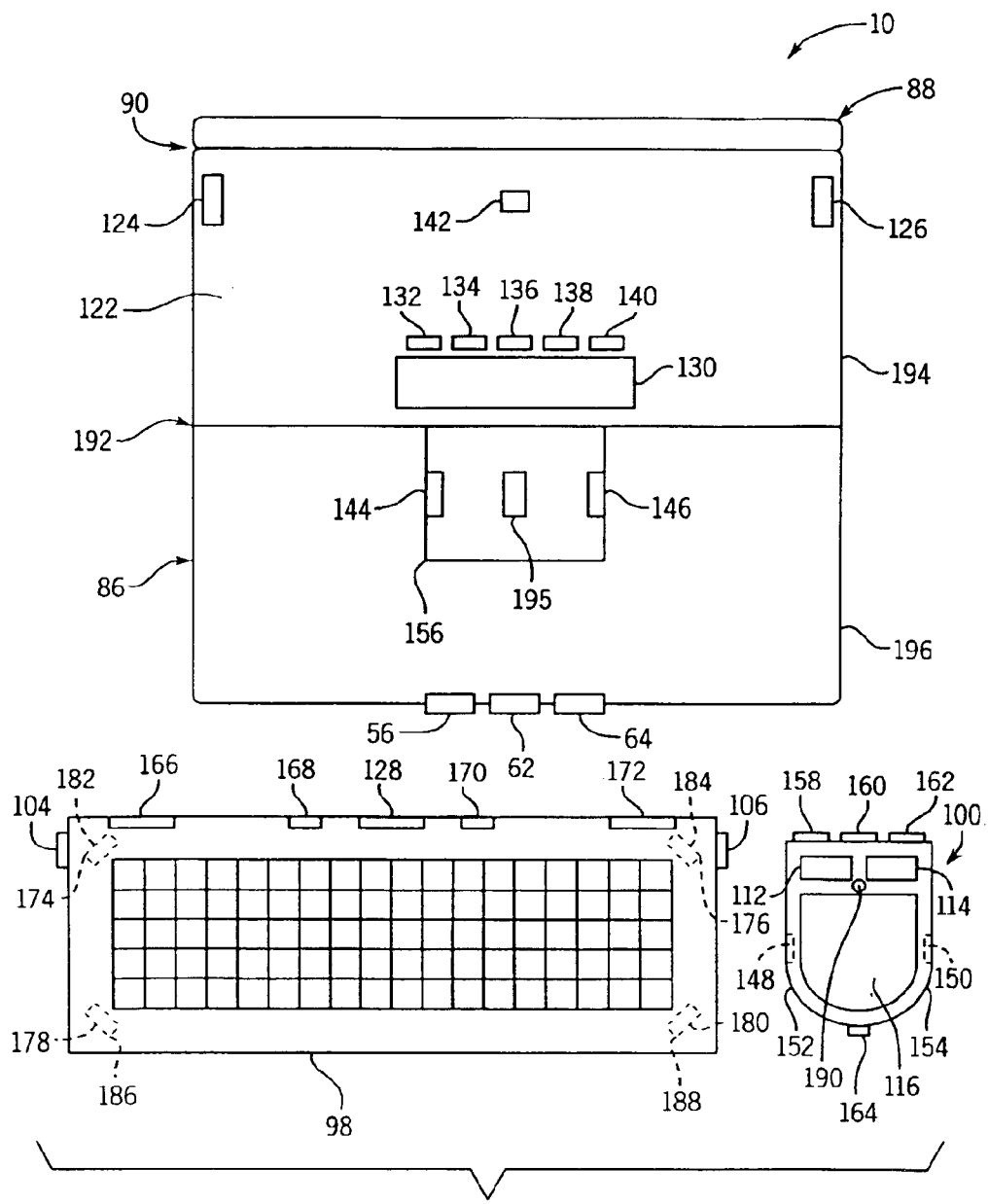
FIG. 4 is a top view of the computing device having the keyboard and a pointing device removed from receptacles on the computing device.

FIG. 4 is a top view of the computing device 10 of FIG. 3. As illustrated, a display 130 and a plurality of buttons, such as buttons 132, 134, 136, 138 and 140, may be disposed in the receptacle 122 of the computing device 10. The display 130 may be an LCD display or another compact display assembly, which may be particularly well suited for displaying status and other desired information and for interaction with the computing device 10. Moreover, the buttons 132, 134, 136, 138, and 140 are provided for interacting with the display 130, such as browsing through menus and activating particular functions in the display 130, or for interacting with the computing device 10 in other ways.

The computing device 10 also has a release 142 disposed in the receptacle 122. By activating the release 142, the pointing device 100 may be removed from a receptacle 156 in the base 86 adjacent to the receptacle 122. The release 142 is configured to release latches 144 and 146, which are disposed in the receptacle 156, from corresponding slots 148 and 150 disposed in opposite sides 152 and 154 of the pointing device 100. Accordingly, the keyboard 98 may be removed from the receptacle 122 by activating the releases 104 and 106 to release the attachment mechanism from latches 124 and 126, after which, the release 142 may be activated to release the pointing device 100 from the latches 144 and 146. Alternatively, the keyboard 98 and the pointing device 100 may be simultaneously released from the base 86 via a software routine, an automatic release triggered by an event in the computing device 10, or by one or more buttons on the keyboard, such as the button 118 illustrated in FIG. 2.

As illustrated, the pointing device 100 is configured for wireless communication with the computing device 10. For example, as with the port 128 of the keyboard 98, the pointing device 100 may have a wireless communication port, such as ports 158, 160, and 162. In the illustrated configuration, the pointing device 100 may utilize any one of the ports 158, 160, and 162 for communication with one of the ports 56, 62, and 64 disposed on the base 86 of the computing device 10. For example, the ports 158, 160, and 162 may comprise a radio frequency communication assembly, an IRDA communication assembly, and an optical or digital communication assembly, respectively. The pointing device 100 also may have one or more non-wireless communication ports, such as a port 164, to communicate with other computing devices or systems. For example, the port 164 may be a USB port, a IEEE 1394 port, or another suitable or hot-pluggable communication port. The keyboard 98, as discussed with reference to FIG. 3, includes the port 128 for wireless communication with the port 62 of the computing device. However, the keyboard 98 also may have a plurality of other ports, such as ports 166, 168, 170, and 172, for communication with other standard, custom, wireless or nonwireless communication ports. For example, the ports 166 and 172 may have wireless technology, such as that discussed with reference to ports 158, 160, and 162 of the pointing device 100. Accordingly, the ports 166, 128, and 172 may facilitate wireless communication with the computing device 10 and various other computing devices having wireless technology. Also, the ports 168 and 170 may include non-wireless communication technology, such as a USB port, an IEEE 1394 port, a serial port, or a variety of other custom or standard communication assemblies.

It should be noted that the configurations illustrated in FIGS. 3 and 4 facilitate a more efficient utilization of work space for a particularly work environment. For example, the computing device 10 may be positioned at a rear portion of a desk or other horizontal surface, while the keyboard 98 and pointing device 100 may be orientated relatively close to the user. Accordingly, the computing device 10 of the present technique provides the benefits of both portable and stationary computer systems, while eliminating certain drawbacks of each of the respective systems.

In a detached configuration of the keyboard 98, as illustrated in FIG. 4, the keyboard 98 may be adjusted to a desired angle and height by use of legs 174, 176, 178, and 180. For example, the legs 174 and 176 may have hinges 182 and 184, respectively, to facilitate a rotation of the legs 174 and 176 to a desired height of the keyboard 98. On the opposite side of the keyboard 98, the legs 178 and 180 are rotatably attached to the bottom of the keyboard 98 via hinges 186 and 188, respectively, to allow rotation of the legs 178 and 180 to a desired orientation to raise or lower that side of the keyboard 98. It should also be noted that the pointing device 100 may have a rollerball, a pointing stick, or a variety of other coordination devices rather than the touch pad 116. Moreover, the pointing device 100 may have a receptacle 190 adapted for a pointing stick device, which may be removably inserted into the receptacle 190 as needed by the user.

The computing device 10 also comprises a plurality of hinge structures to facilitate multiple configurations and orientations of the computing device and its various components. For example, as illustrated in FIG. 4, the computing device 10 has the hinge 90 disposed between the display 88 and the base 86 and also a hinge 192 disposed between a base section 194 and a base section 196, which may be rotated with respect to each other along the hinge 192 by actuating a latch release mechanism. For example, a latch release 195 may be disposed in the receptacle 156 or another suitable location for unlocking the sections 194 and 196 after interfering components (e.g., keyboard 98) are removed from the computing device 10. It should also be noted that the base sections 194 and 196 can be unlocked for rotation about the hinge 192 via a software routine, a keypad button such as button 118, or other suitable automatic or software driven release mechanisms. Accordingly, upon releasing the base section 194 and 196, the computing device can be reoriented to adapt to a particular working environment or space limitation. For example, the base section 194 maybe rotated about the hinge 192 to an upright orientation relative to the base section 196.

Figure 5:
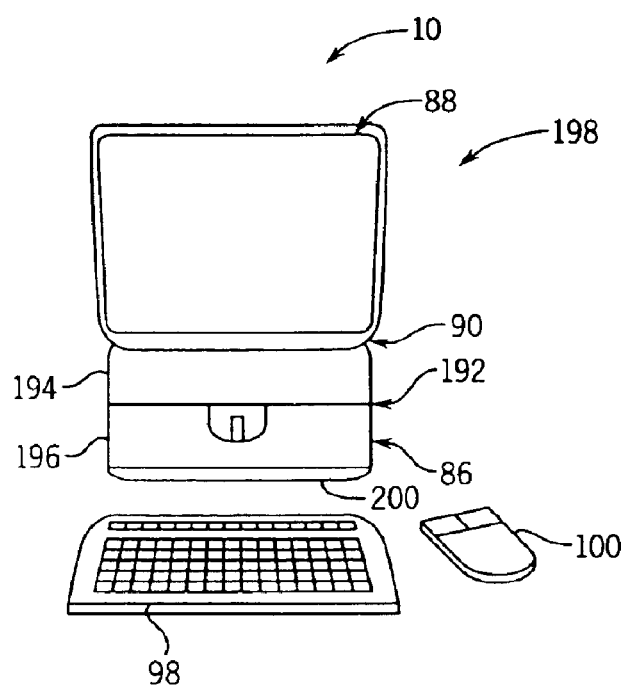
FIG. 5 is a front perspective view of the computing device illustrating a modified housing configuration having a first housing section horizontally oriented and a second housing section rotated about the first housing section to an upright orientation.

FIG. 5 is a perspective view of the computing device 10 in an operational configuration 198 having the display 88 in an upright orientation, the base section 196 in a horizontal orientation, and the base section 194 rotated about the hinge 192 to an upright orientation. In this operational configuration 198, the keyboard 98 and the pointing device 100 are removed from the base 86. Also, in this operational configuration 198, the computing device 10 has a relatively smaller footprint comprising a base surface 200 of the base section 196. Thus, the computing device 10 uses less horizontal space than conventional desktop and portable computer systems, while also facilitating flexible configuration and operability of the computing device 10 in both portable and stationary working environments.

Figure 6:
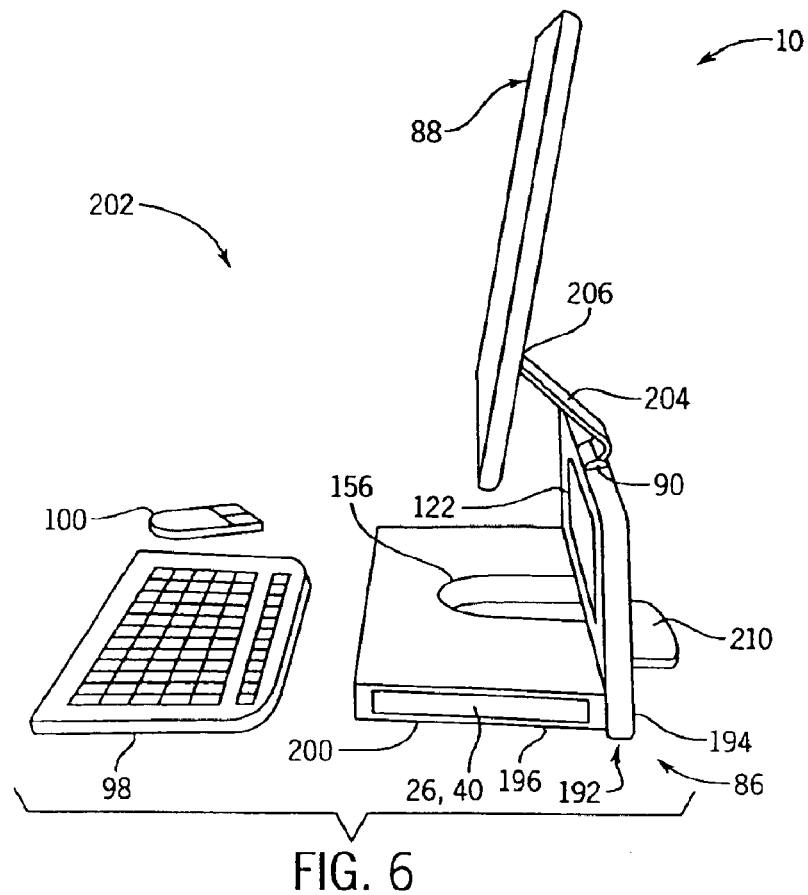
FIG. 6 is a side perspective view of the computing device illustrating a display rotatably coupled to the modified housing configuration via a connector arm.

FIG. 6 is a perspective view of the computing device 10 illustrating another operational configuration 202 configured such that the computing device 10 consumes a horizontal surface area comprising only the base surface 200. As illustrated, the keyboard 98 and the device 100 are detached from the receptacles 156 and 122, respectively, of the base 86. Similar to the operational configuration 198 of FIG. 5, the operational configuration 202 has the base section 196 in a horizontal orientation, the base section 194 rotated about hinge 192 to an upright orientation with respect to the base section 196, and has the display 88 coupled to the base section 194 via a member 204. As illustrated, the member 204 is rotatably coupled to the base section 194 via the hinge 90 and is rotatably coupled to the display 88 via a hinge 206 opposite the hinge 90. Accordingly, the operational configuration 202 comprises a three-hinge structure, which facilitates a more flexible orientation of the display 88 and the base sections 194 and 196. Thus, the display 88 can be rotated about the hinges 206 and 90 to a desired height and viewing angle for the display screen 92. For example, if the member 204 is rotated to an upright angle, as illustrated in FIG. 6, the display 88 can be positioned in a relatively higher vertical orientation while also allowing rotation of the display 88 about the hinge 206 to a desired viewing angle. Likewise, the member 204 can be rotated downwardly about the hinge 90 to position the display 88 at a relatively lower vertical orientation, as illustrated in FIG. 7.

Figure 7:
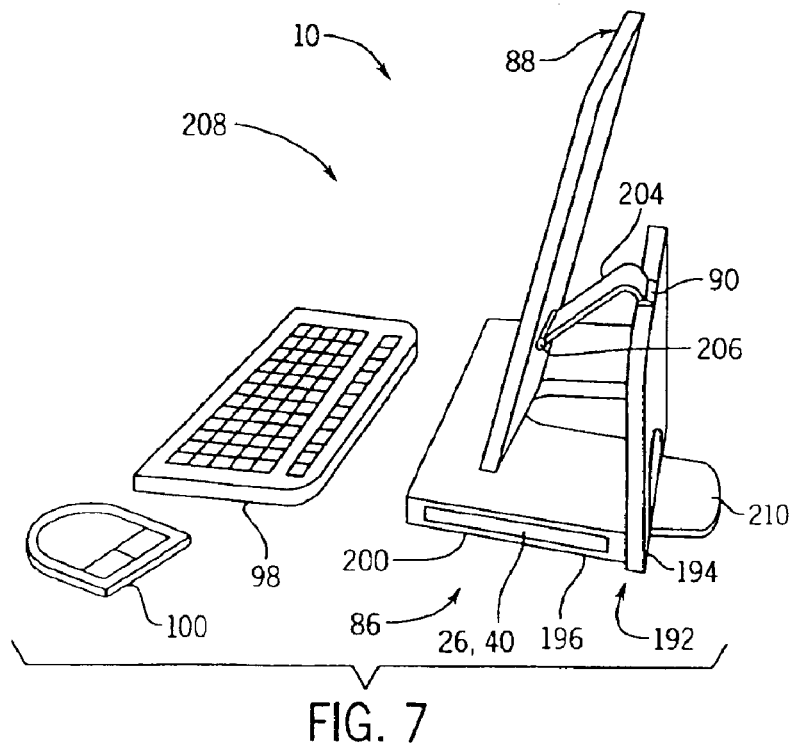
FIG. 7 is a side perspective view of the computing device of FIG. 6 having the display in a lowered configuration relative to the modified housing configuration.

In FIG. 7, the display 88 and member 204 are rotated about the hinges 206 and 90, respectively, to orient the display 88 adjacent the base section 196. Accordingly, the computing device 10 can be oriented with a minimal vertical orientation of the display 88, as illustrated in FIG. 7, all the way up to a maximum vertical orientation as determined by the length of the member 204. To facilitate maximum flexibility in orienting the various components of the computing device 10, the member 204 may be constructed with a variety of lengths, and may have a length variance assembly to facilitate variable lengths of the member 204. For example, the member 204 may include a telescopic assembly, which can significantly increase the overall effective length of the member 204. Moreover, the member 204 may be slidably attached to the display 88 and the base section 194.

In one configuration, the member 204 and the hinge 90 may be slidably and rotatably coupled to a linear positioning assembly, which may be disposed in a receptacle extending into the base section 194. For example, the linear positioning assembly may comprise a rail assembly, a telescopic extension assembly, or a variety of other variable linear positioning systems. Accordingly, the member 204 and the hinge 90 may be extended outwardly from the base section 194 or inwardly into the receptacle of the base section 194. By using such a linear positioning assembly, the member 204 may be significantly lengthened or it may be completely engulfed inside of the receptacle, thereby removing the operability of the hinge 90 and effectively providing a configuration having only the hinge 206 between the display 88 and the base section 194.

In another configuration, the member 204 and the hinge 206 may be linearly and rotatably coupled to the display 88, similarly to the configuration just described with respect to the hinge 90.

In these various configurations, the computing device 10 may benefit from an additional support member or mount assembly. For example, as illustrated in FIGS. 6 and 7, the computing device 10 has a foot 210 adjustably coupled to the base 86 of the computing device 10. The foot 210 may be slidably coupled to the base section 196 in an open or closed receptacle. For example, the foot 210 may be disposed along the base surface 200, such that the foot 210 can be manually removed or automatically ejected from the receptacle via a manual or electrically-driven release assembly. For example, an electrical release assembly may be triggered by hardware or software disposed in the computing device 10. Similarly, the foot 210 may be reinserted into the receptacle via a manual or electrical assembly.

It should also be noted that the rotation of the display 88, the member 204, and the base section 194 about the hinges 206, 90, and 192 may be electrically driven and rotated automatically via a software or hardware triggered device. For example, the user may interact with, and configure, the computing device 10 locally or remotely by activating various electrical mechanisms via the keyboard 98 and the pointing device 100. This electrically driven positioning may include both rotation about the hinges and also sliding along linear positioning assemblies, as described above. Accordingly, the computing device 10 may be automatically or manually positioned to a plurality of positioned by the user, either at a distance via the keyboard 98 and the pointing device 100, or at the computing device 10 itself via manual adjustment mechanisms. This provides maximum flexibility in orienting the computing device 10 to adapt to any particular working or computing environment. The keyboard 98 and the pointing device 100 also can be used to operate the various drives disposed in the base of the computing device 10. For example, the user may interact with the drive 40 disposed in the bay 26.

Figure 8:
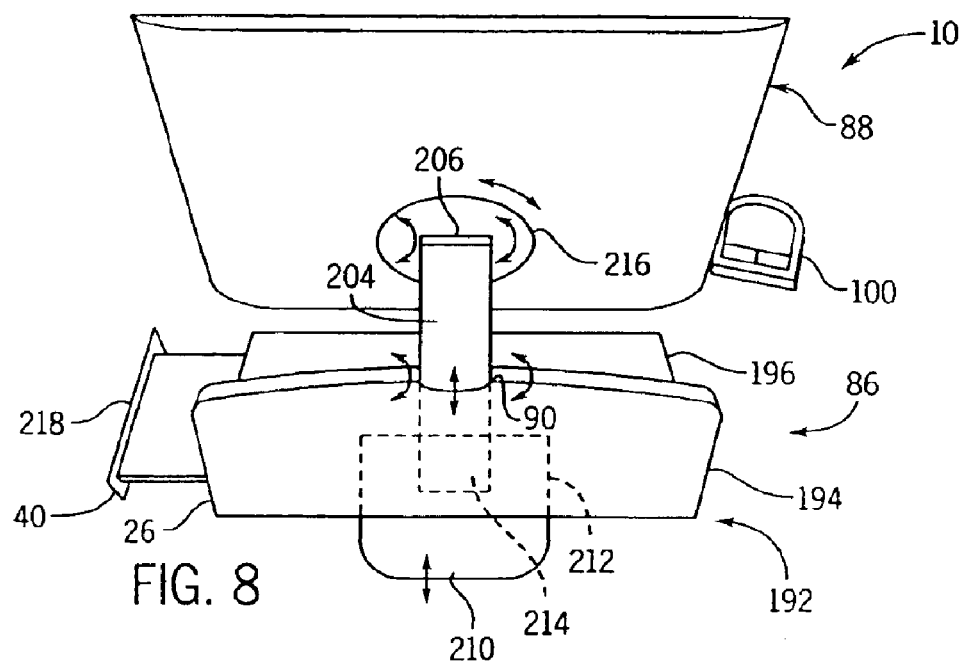
FIG. 8 is a rear perspective view of the computing device of FIGS. 6 and 7.

FIG. 8 is a rear perspective view of the computing device 10, which is oriented in a position similar to that illustrated in FIGS. 6 and 7. As illustrated, the computing device 10 is provided with a foot receptacle 212 for removable accepting and housing the foot 210. This foot receptacle 212 is particularly useful for a closed configuration, such as illustrated in FIG. 1, in working environments having limited horizontal working space, or in configurations not requiring lateral support. Also note that the foot 210 may be configured in a fixed orientation, as illustrated in FIG. 9, while the base section 194 simply rotates about the hinge 192 to the upright orientation leaving the foot 210 exposed and thereby providing additional lateral support in the upright orientation.

The computing device 10 also includes a linear positioning assembly 214 disposed in the base section 194 adjacent the member 204 and the hinge 90. Accordingly, as described above with reference to FIG. 7, the linear positioning assembly 214 may facilitate a variable length of the member 204 and also facilitate further flexibility in the orientation of the display 88 and the overall computing device 10. In this illustrated embodiment of the computing device 10, an angular adjustment assembly 216 is disposed between the hinge 206 of the member 204 and the display 88. Accordingly, the angular adjustment assembly 216 facilitates angular rotation of the display 88 about the hinge 206 to achieve a desired angular orientation of the display 88. This angular adjustment may be particularly useful where the mounting surface for the base section 194 is uneven or if the user desires a display angle based on the user's viewing angle.

It should also be noted that the various drives, as described with reference to FIG. 1, may have ejectable portions such as tray 218 for the drive 40. Alternatively, the drives may simply have a receptacle for inserting a desired media, such as a CD, DVD, or disc. It should also be noted that both the foot 210 and the member 204 may comprise multiple feet or lateral support members, and also may have various dimensions depending on the overall dimensions of the computing device 10 and the particular application of the computing device 10.

Figure 9:
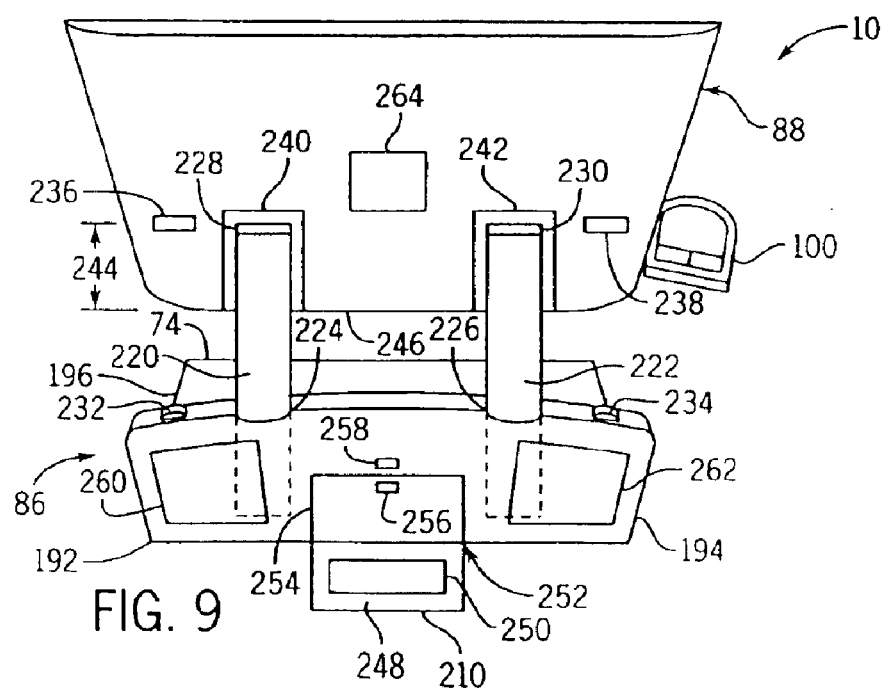
FIGS. 9 and 10 are rear perspective views of alternate embodiments of the computing device.

FIG. 9 is a perspective view of an alternate embodiment of the computing device 10. As illustrated, the computing device 10 is configured in a substantially upright orientation similar to the operational configurations 202 and 208 illustrated in FIGS. 6 and 7, respectively. In this embodiment, the base section 194 is configured in a horizontal orientation, the base section 196 is rotated about the hinge 192 to an upright orientation, and the display 88 is rotatably coupled to the base section 194 via orientation arms 220 and 222. The orientation arms 220 and 222 are rotatably coupled to the base section 194 via hinges 224 and 226, respectively, while the opposite ends of the orientation arms 220 and 222 are rotatably coupled to the display 88 via hinges 228 and 230, respectively.

As illustrated, the base section 194 also has tension adjustment assemblies 232 and 234 adjacent the hinges 224 and 226 for adjusting the tension of the hinges 224 and 226. Accordingly, the hinge tension can be adjusted to facilitate or inhibit movement about the hinges 224 and 226 to achieve the desired orientation of the orientation arms 220 and 222. The tension adjustment assemblies 232 and 234 may comprise adjustment wheels, a slide mechanism, or any other suitable tension adjustment assembly. The hinges 228 and 230 also may have tension adjustment assemblies. Moreover, the hinges 228 and 230 may have releases for removing the display 88 from the orientation arms 220 and 222. For example, releases 236 and 238 are provided on the display 88 adjacent the hinges 228 and 230, respectively, such that the releases 236 and 238 may be activated to release a pin, or other coupling mechanisms, in the hinges 228 and 230 and thereby release the orientation arms 220 and 222 from the display 88. The releases 236 and 238 also may incorporate tension adjustment assemblies similar to the tension adjustment assemblies 232 and 234 used with the hinges 224 and 226.

Moreover, the display 88 may have recessed areas 240 and 242 disposed about the orientation arms 220 and 222 to facilitate a relatively low profile geometry of the display 88 and the overall computing device 10 in an upright orientation, as illustrated, or in a closed orientation, as illustrated in FIG. 1. It should also be noted that the orientation arms 220 and 222 may be rotatably coupled to the display 88 at an offset 244 from a base portion 246 of the display 88. Thus, the display 88 and the orientation arms 220 and 222 may be rotated about the hinges 228 and 230 and 224 and 226, respectively, to facilitate a desired vertical orientation and angular orientation of the display 88. For example, the display 88 may be orientated in the upward orientation, as illustrated in FIG. 9, or the display 88 may be rotated downwardly towards the base section 196. Furthermore, the orientation arms 220 and 222 may be coupled to the display 88 and the base section 194 via linear positioning systems, such as those described above with reference to FIGS. 7 and 8.

The computing device 10 illustrated in FIG. 9 also has the foot 210 extending from the base section 194. However, in the illustrated embodiment, the foot 210 also includes a handle section 248 adjacent an open portion 250. Thus, the foot 210 functions as both a handle and a lateral support to facilitate maximum versatility of the computing device 10. The foot 210 is also configured to rotate about a hinge 252 into a recessed area 254, where it may be locked into place via a latch mechanism 256 and may be released via a release mechanism 258 disposed adjacent the recessed area 254.

As discussed with reference to FIG. 1, the computing device 10 also may have a plurality of bays and devices disposed in various portions of the display 88, the base section 194, and the base section 196. In this exemplary embodiment, the base section 194 has removable hatches 260 and 262, which may be removed to insert and access computing components, such as RAM, a processor, flash cards and other devices. The display 88 also may have one or more hatches for computing devices or components. For example, the display 88 has a hatch 264, which may be configured to receive a flash card, a video memory module, a battery, or a variety of other computing components.

It should also be noted that, in the illustrated embodiment, the display 88 may be readily removed via the releases 236 and 238 to exchange the display 88 with a larger display or a display having a customized geometry. Moreover, the display 88 may be entirely removed from the computing device 10 and mounted on a separate mount assembly. Thus, the electrical connections running from the base 86 to the display 88 are configured to facilitate rotational movement of the hinges 224 and 226 and hinges 228 and 230, while also facilitating a hot-plugging of the display 88 with the remainder of the computing device 10. Thus, at the hinges 228 and 230, the computing device may have a plurality of conductors that support and power the display 88. Accordingly, the computing device 10 facilitates versatile and flexible configuration, orientation and operation of the computing device 10 for a broad range of environments, or computing worlds.

Figure 10:
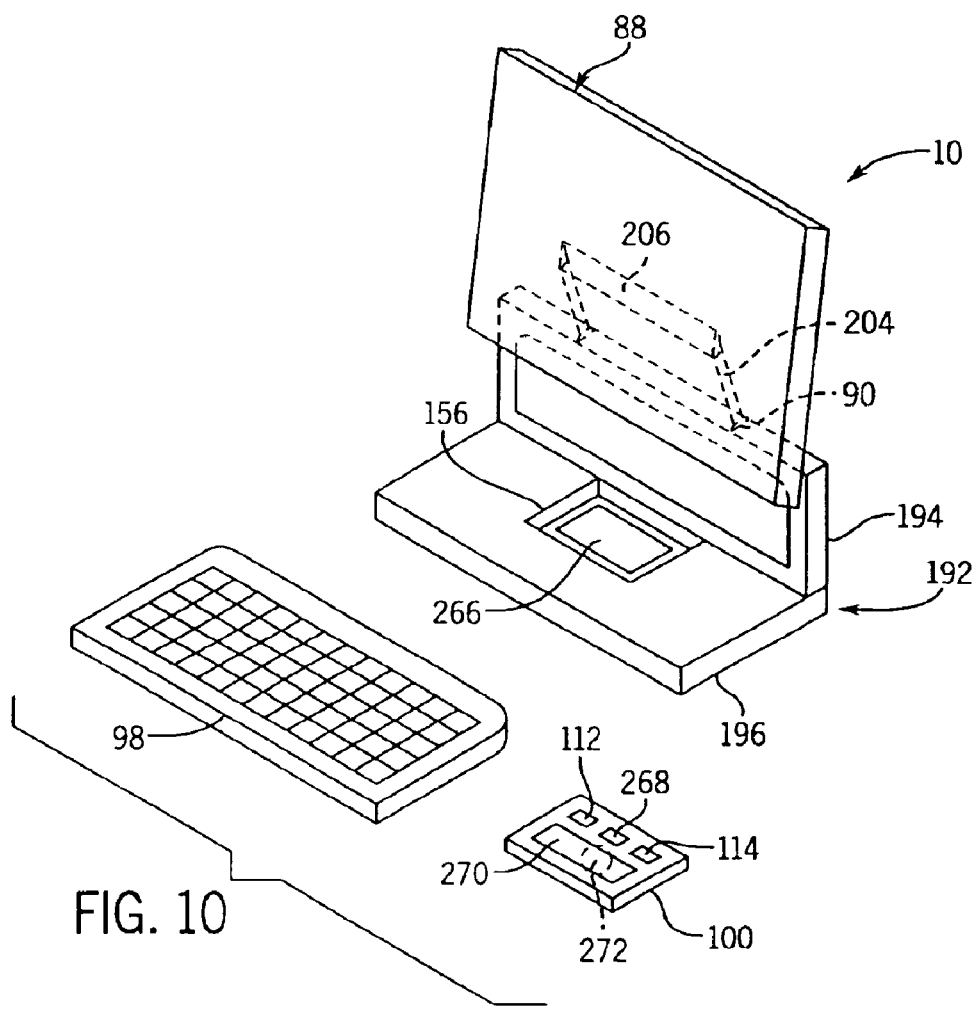

FIG. 10 is a perspective view of an alternate embodiment of the computing device 10. As illustrated, the receptacle 156 in the base section 196 has a rectangular geometry, which is configured for a rectangular configuration of the pointing device 100. A display 266 may be disposed in the receptacle 156 to provide status information of the computing device 10, and also to generally facilitate interaction between the user and the computing device 10. The display 266 may be an LCD display or any other suitable display. The display also may have a plurality of buttons for interacting with the display 266 and the computing device 10. The pointing device 100 may have a plurality of buttons, such as buttons 112, 114, and 268, and a display 270 disposed on a top portion of the pointing device 100. As described with the display 266, the display 270 also may have various buttons for interacting with the display 270 and the computing device 10. The pointing device 100 also may have a roller ball 272 disposed on a bottom surface of the pointing device 100, rather than utilizing the touch pad 116 illustrated in FIG. 4.

Various other input/output assemblies also may be incorporated into the computing device 10 within the scope of the present technique.

It should also be noted that the various components and computing devices incorporated into the computing device 10 may comprise a variety of geometries, electrical technologies, and other assemblies and technologies to facilitate a more integrated and efficient computing system. For example, the member 204, which is rotatably coupled to the display 88 and the base section 194 via hinges 206 and 90, respectively, may have a variety of geometries and coupling assemblies. In the embodiment of FIG. 10, the member 204 has a relatively broad geometry to support the display 88. This geometry may vary according to the overall size of the computing device 10, the overall geometry and weight of the display 88, and the expected application of the computing device 10. For example, an industrial application of the computing device 10 may require a substantially stronger hinge and support assembly to withstand heavier vibrations and relatively more abuse than a typically consumer application. Thus, the member 204, as well as many other components and devices of the computing device 10, may have widely varying geometries and configurations to suit a particular application. The member 204 itself may be as wide as the entire computing device 10, or it may comprise a plurality of smaller members, such as the orientation arms 220 and 222 illustrated in FIG. 9. Overall, the computing device 10 is configured to adapt to a desired working environment and also to eliminate the necessity for multiple independent computing systems. Thus, the present technique lowers the overall cost of computing in various working environments, while maintaining the benefits of each respective computing system.

While the invention may be susceptible to various modifications and alternative forms, specific embodiments have been shown by way of example in the drawings and have been described in detail herein. However, it should be understood that the invention is not intended to be limited to the particular forms disclosed. For example, the present technique may be applied to a variety of computing systems, computing components, and other electronic and computing devices, each having various components and features. The present technique also may use a variety of mounting structures to position the particular device in the desired location. Moreover, a broad spectrum of electronic and communication technologies can be employed within the scope of the present technique. For example, wireless communication, blue tooth technologies, hot-plugging and plug-n-play technologies, optical and digital technologies, and other emerging technologies are all within the scope of the present technique. Accordingly, the invention is intended to cover all modifications, equivalents, and alternatives falling within the spirit and scope of the invention as defined by the following appended claims.

What is claimed is:

1. A computer system, comprising:
   a component housing comprising:
      a first section;
      a second section rotatably coupled to the first section;
      a third section rotatably coupled to the second section, wherein the first, second, and third sections are rotatable between a plurality of configurations having different base geometries configured to rest on a supporting surface during operation of the computer system and at least two of the first, second, and third sections are configured to house electronic components, wherein one of the first, second, and third sections comprises a connector arm; and
      a display rotatably coupled to the component housing via the connector arm.

2. The computer system of claim 1, wherein the component housing comprises a flat panel housing.

3. The computer system of claim 1, wherein the component housing comprises computing circuitry.

4. The computer system of claim 3, wherein the computing circuitry comprises a processor.

5. The computer system of claim 3, wherein the computing circuitry comprises memory.

6. The computer system of claim 3, wherein the computing circuitry comprises a power supply.

7. The computer system of claim 1, wherein the component housing comprises an input device.

8. The computer system of claim 7, wherein the input device comprises a separable pointing device.

9. The computer system of claim 7, wherein the input device comprises a separable keyboard.

10. The computer system of claim 1, wherein the component housing comprises a support structure for supporting an angular orientation of the second section relative to the first section.

11. The computer system of claim 10, wherein the support structure comprises a horizontal mount structure.

12. The computer system of claim 1, wherein the component housing comprises an angular lock assembly for securing the component housing at a desired relative angle between the first section and the second section.

13. The computer system of claim 1, wherein the display comprises a flat panel display.

14. The computer system of claim 1, wherein the connector arm comprises first and second pivot joints disposed on opposite ends of the connector, the first pivot joint rotatably coupled to the display and the second pivot joint rotatably coupled to the component housing.

15. The computer system of claim 1, wherein the connector arm comprises a releasable display mount.

16. The computer system of claim 15, wherein the connector arm comprises a hot-pluggable electrical coupling mechanism configured for removably coupling the display to the component housing during operation of the computer system.

17. The computer system of claim 1, wherein the different base geometries include a first base geometry having both the first section and the second section abutting the supporting surface.

18. A space saving system for a computing device, comprising:
   a display;
   a multi-sectional housing comprising a first underside and at least one housing section rotatable to an upright orientation to provide a second underside having dimensions smaller than the first underside, wherein the first underside and the second underside are each configured to contact a supporting surface during operation of the computing device; and
   an intermediate member rotatably coupled to the display at a first end and rotatably coupled to the at least one housing section at a second end.

19. The space saving system of claim 18, wherein the display comprises a flat panel display.

20. The space saving system of claim 18, wherein the multi-sectional housing comprises a panel-shaped component housing.

21. The space saving system of claim 18, comprising computing circuitry disposed in the multi-sectional housing.

22. The space saving system of claim 21, wherein the computing circuitry comprises a power supply configured for mobile computing.

23. The space saving system of claim 21, wherein the computing circuitry comprises a wireless communication system.

24. The space saving system of claim 18, comprising an input device removably coupled to the multi-sectional housing.

25. The space saving system of claim 18, wherein the intermediate member comprises a connector arm having a first end rotatably coupled to the multi-sectional housing and a second end rotatably coupled to the display at an offset distance from the multi-sectional housing.

26. The space saving system of claim 18, comprising a releasable display mount disposed at one of the first and second ends.

27. The space saving system of claim 18, comprising a support structure for supporting the at least one housing section of the multi-sectional housing in the upright orientation.

28. The space saving system of claim 18, wherein the multi-sectional housing comprises rotatably coupled adjacent sections configured for a plurality of angular orientations.

29. The space saving system of claim 28, wherein the rotatably coupled adjacent sections comprise a base housing section having the second underside and the at least one housing section, which is rotatable between a base orientation having an added underside and the upright orientation configured for decreasing space consumption of the multi-sectional housing.

30. The space saving system of claim 18, wherein the first underside includes an underside of the at least one housing section and another underside of at least one other section of the multi-sectional housing, such that the second underside excludes the underside of the at least one housing section.

31. A computer structure, comprising:
a body having at least four rotatably coupled sections comprising at least two component housing sections configured to support computing components and at least one display housing configured to support a display, wherein the at least four rotatably coupled sections are rotatable between configurations having at least two different foundations, each configured rest on a surface to support the body in the configurations during operation.

32. The computer structure of claim 31, wherein the at least two component housing sections are coupled at a pivot joint and rotatably movable between an L-shaped configuration and a substantially flat configuration.

33. The computer structure of claim 31, wherein the configurations comprises a folded configuration having a substantially flat arrangement of the rotatably coupled sections.

34. The computer structure of claim 31, wherein the configurations comprises a zigzagging configuration of at least a portion of the at least four rotatably coupled sections.

35. The computer structure of claim 34, wherein the at least four rotatably coupled sections comprise an intermediate member disposed between the at least one display housing and one of the at least two component housing sections, the configurations comprising a working configuration having the at least one display housing positioned at a desired viewing orientation for the display and having the at least two component housing sections positioned at a desired orientation for mounting on a surface.

36. The computer structure of claim 31, wherein the rotatably coupled sections comprise an intermediate member rotatably coupled to one of the at least two component housing sections at one end of the intermediate member, and rotatably coupled to the at least one display housing at an opposite end of the intermediate member.

37. The computer structure of claim 36, wherein the intermediate member comprises a connector arm.

38. The computer structure of claim 36, comprising a releasable display coupling disposed at one of first and second ends of the intermediate member.

39. The computer structure of claim 31, comprising at least a portion of the computing components integrally coupled within the plurality of rotatably coupled sections, wherein the computing components comprise the display and a processor, and the display includes a panel display screen.

40. The computer structure of claim 31, wherein the at least two different foundations include a first foundation formed by multiple sections of the at least two component housing sections.

41. A method of forming a computing device having versatile configurations, comprising:
rotatably coupling a plurality of panels configured for computing components;
rotatably coupling a display panel support structure to one of the plurality of panels via an intermediate member; and
supporting the plurality of panels, the display panel, and the intermediate member in a plurality of rotated configurations having different bottom mounting surfaces, each of the bottom mounting surfaces configured to be seated on a surface during operation of the computing device.

42. The method of claim 41, wherein rotatably coupling the plurality of panels comprises rotatably coupling a first housing section to a second housing section, and wherein rotatably coupling the display panel support structure comprises rotatably coupling a first end of the intermediate member to the display panel support structure and rotatably coupling a second end of the intermediate member to the second housing section.

43. The method of claim 41, wherein supporting comprises providing a locking assembly to lock the plurality of panels and the display panel support structure in a desired orientation.

44. The method of claim 41, wherein supporting comprises supporting a zigzagging configuration of at least a portion of the plurality of panels and the display panel support structure.

45. The method of claim 41, wherein supporting the plurality of base structures in different geometrical orientations comprises supporting a folded configuration having a substantially flat arrangement of the plurality of panels adjacent the display panel support structure.

46. The method of claim 41, comprising coupling a carrying handle to the computing device.

47. The method of claim 41, comprising coupling a plurality of the computing components to the plurality of panels, the computing components comprising wireless communication circuitry.

48. The method of claim 41, comprising removably coupling an input device to at least one of the plurality of panels.

49. A method of merging computing worlds, comprising:
geometrically orienting at least four sections of a multi-configurable computing device to a configuration having a desired one of a plurality of different base sizes via at least three independently pivotable joints disposed between the at least four sections, each of the plurality of different base sizes configured to rest on a supporting surface during operation of the multi-configurable computing device.

50. The method of claim 49, wherein geometrically orienting at least four sections comprises geometrically adapting the multi-configurable computing device for available space in a desired computing environment.

51. The method of claim 49, wherein geometrically orienting at least four sections comprises rotating first and second component housing sections about a first joint of the at least three independently pivotable joints.

52. The method of claim 51, wherein geometrically orienting at least four sections comprises rotating a display panel relative to the first and second component housing sections.

53. The method of claim 52, wherein rotating the display panel comprises rotating the display panel about a second joint of the at least three independently pivotable joints, the second joint being rotatably disposed between the display panel and the second component housing.

54. The method of claim 52, wherein rotating the display panel comprises rotating the display panel about a display connector arm rotatably coupled to the display panel and the second component housing via second and third joints of the at least three independently pivotable joints.

55. The method of claim 49, comprising facilitating wireless communication between the multi-configurable computing device and at least one separable computing component.

56. The method of claim 49, comprising merging portable and desktop computing worlds.

57. The method of claim 50, comprising forming a unique class of versatile computing devices tailored to replace portable and desktop computer systems.

58. A computer system, comprising:
   a component housing comprising:
      a first section;
      a second section rotatably coupled to the first section; and
      a third section rotatably coupled to the second section, wherein the first, second, and third sections are rotatable between a plurality of configurations having different base geometries configured to rest on a supporting surface during operation of the computer system and at least two of the first, second, and third sections are configured to house electronic components, wherein the component housing comprises a removable wireless input device; and
   a display rotatably coupled to the component housing.

59. A computer system, comprising:
   a component housing comprising:
      a first section;
      a second section rotatably coupled to the first section;
      a third section rotatably coupled to the second section, wherein the first, second, and third sections are rotatable between a plurality of configurations having different base geometries configured to rest on a supporting surface during operation
         of the computer system and at least two of the first, second, and third sections are configured to house electronic components;
   a display rotatably coupled to the component housing; and
   an integral handle assembly coupled to the component housing.

* * * * *

UNITED STATES PATENT AND TRADEMARK OFFICE
CERTIFICATE OF CORRECTION

PATENT NO. : 6,873,521 B2
APPLICATION NO. : 09/912696
DATED : March 29, 2005
INVENTOR(S) : Christian C. Landry et al.

Page 1 of 1

It is certified that error appears in the above-identified patent and that said Letters Patent is hereby corrected as shown below:

Column 6, line 34, after "mechanism" insert --to release an angular lock--

Column 6, line 34, after "example," delete "a" and insert therefor --an angular lock and--

Column 6, line 36, before "unlocking" insert --locking and--

Column 6, line 42, after "driven" insert --angular lock and--

Signed and Sealed this

Twenty-seventh Day of October, 2009

David J. Kappos
*Director of the United States Patent and Trademark Office*